No. 858,801. PATENTED JULY 2, 1907.
W. E. ELLIOTT.
CLUTCH MECHANISM.
APPLICATION FILED JUNE 2, 1905.
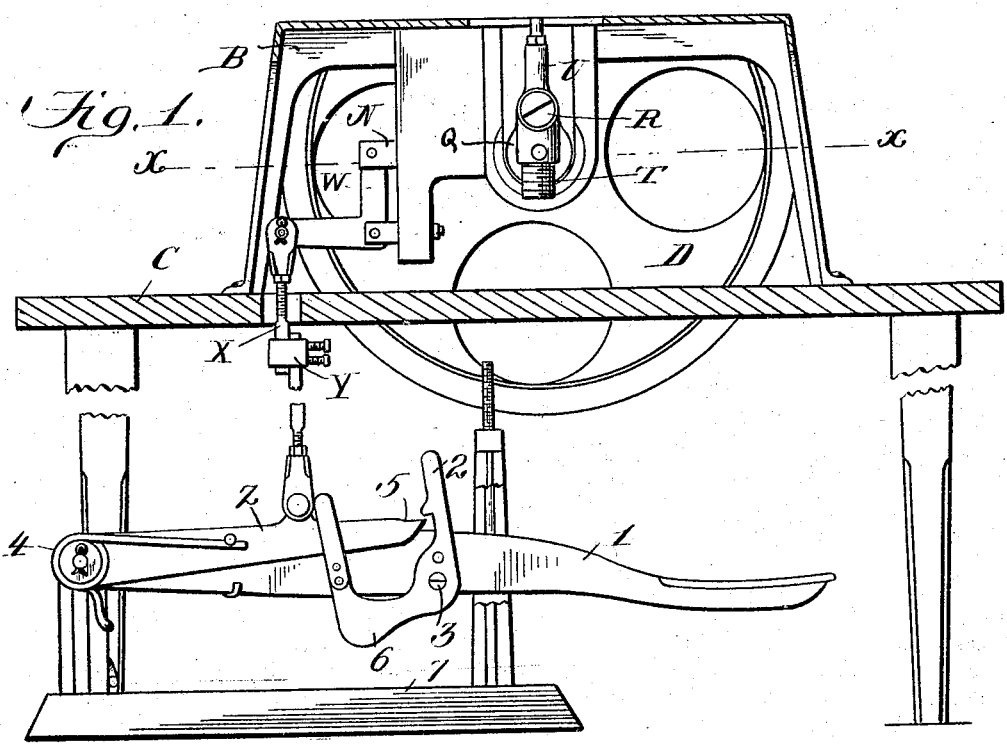
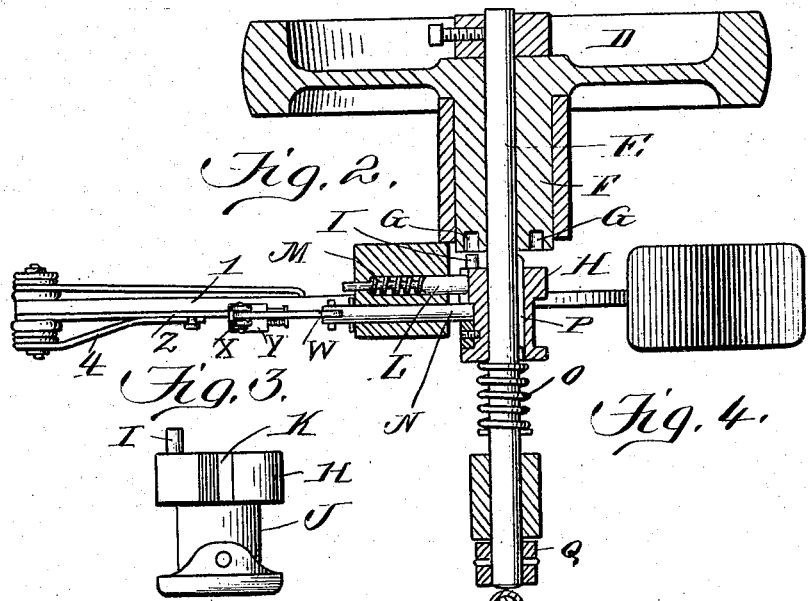
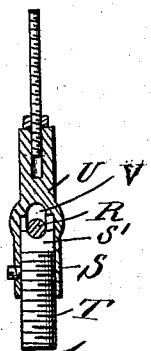
Witnesses:
C. D. Kesler
Robert Everett
Inventor
William E. Elliott
By Edward Taggart

UNITED STATES PATENT OFFICE.

WILLIAM E. ELLIOTT, OF GRAND RAPIDS, MICHIGAN.

CLUTCH MECHANISM.

No. 858,801.     Specification of Letters Patent.     Patented July 2, 1907.

Original application filed November 22, 1893, Serial No. 491,655. Divided and this application filed June 2, 1905.
Serial No. 263,454.

To all whom it may concern:

Be it known that I, WILLIAM E. ELLIOTT, a citizen of the United States, residing at Grand Rapids, in the county of Kent and State of Michigan, have invented new and useful Improvements in Clutch Mechanism, of which the following is a specification.

My invention relates to improvements in clutch mechanism and is especially intended for use in connection with a machine for attaching buttons to shoes, for which complete machine I have filed an application for a patent in the United States Patent Office, which application is now pending and is Serial No. 491,655 filed Nov. 22, 1893. My invention, however, so far as it embodies the clutch mechanism relates equally to any machine in which the rotation of a power feed is converted into a reciprocating longitudinal motion in the operation of the mechanism. The application of which this specification forms a part is therefore filed as a division of said pending application Serial No. 491,655, pursuant to the action of the Patent Office requiring such division.

The special object of my invention is properly to regulate and control the produced longitudinal reciprocation of the machine so that such reciprocation will automatically cease at a predetermined point.

In the operation of this class of machinery it is common to provide some trip or catch operated by the hand or foot of the operator such that while the same is in engagement the produced reciprocating motion will continue and when the same is released from engagement such reciprocating motion will cease; but if, by accident, or inadvertently, the engagement is not released when it should be, the produced reciprocating motion will continue and may do serious harm. For example, in mechanism of the class to which my main invention pertains, viz., for attaching different objects together by inserting staples, it is important that only one staple should be inserted until the articles or fabric receiving the staple are adjusted ready for the next one, and, if the reciprocating staple-attaching mechanism is tripped into engagement with the revolving power feed, in a customary way, as, for example, by the operator holding down a foot treadle, and if the operator omits to remove his foot at the proper moment, the mechanism will continue in engagement and will attach another staple when and where it may not be desired; or, in case of a punch press, if the engagement is inadvertently not broken, the dies will come together a second time and injure the article or the hand of the operator.

To avoid these difficulties is the object of the present invention, which I accomplish by the mechanism shown in the accompanying drawings, in which—

Figure 1 is a side elevation of the lower part of the machine designed to be used in connection with some suitable power. The mechanism to be ultimately operated, like the staple-attaching mechanism or punch press, would be situated upon the table or frame, shown in this figure, is immaterial to the present invention and is, therefore, not shown. Fig. 2 is a horizontal sectional view on line $x$—$x$ of Fig. 1, showing the clutch mechanism for connecting and disconnecting the parts of the machine. Fig. 3 is a plan view of a sliding sleeve which forms one part of the clutch attachment. Fig. 4 is a pitman attachment connecting the power communicating shaft with the reciprocating mechanism to be operated.

B is a supporting frame which supports the mechanism to be operated and contains parts of the mechanism of this invention. It rests upon a supporting bench or table C.

D is a band pulley receiving the power from any suitable source and transmitting the same through the shaft E to the operated mechanism.

In Fig. 2 F is a hub on the pulley D and is provided with holes G G, which holes engage the pin I of the sleeve H. This sleeve H is supported by and has a sliding movement upon the shaft E, and the sleeve H, with its pin I, together with the hub F, with its holes G G, form a clutch by means of which the pulley D may be connected and disconnected as hereinafter described. The sleeve H is provided with a cam groove J, as shown in Fig. 3, and with a friction stop or depression K, with which friction depression the brake pins L engage in order to stop the movement of the sleeve H as soon as it shall have been detached from the hub F, by means hereinafter described.

M is a spring adapted to press the brake pin L into operative contact with the friction depression K.

N is a pin adapted to engage with the cam J and to withdraw and withhold the sleeve J out of engagement with the hub F. The sleeve is pressed into and held in engagement with the hub F by means of a spring O as soon as the pin N is withdrawn from its locking position.

P is a spline or key which attaches the sleeve to the shaft E in such a manner as to allow the said sleeve to move longitudinally along the shaft for the purpose of attachment to the hub F and detachment therefrom. The spline or key P is so attached to the sleeve that the sleeve will always revolve with its shaft E notwithstanding its longitudinal movement thereof.

Q is a crank on the shaft E connecting said shaft, through the pitman U, to the longitudinally reciprocating mechanism operated by this invention.

R, shown in Figs. 1 and 4, is a crank pin for the crank Q.

S is a journal box containing a bearing block S′ for the crank pin R and is preferably adjusted by means of a screw.

T is an adjustable screw used in adjusting the connections between the power and the operated mechanism.

U is the connecting pitman and it is provided with a slot V in order to allow a sliding movement of the crank pin, thereby providing for adjustment of the operated mechanism to give a different length of stroke.

W is a bell crank connected to the pin N and this bell crank is connected by the draw rod X to the adjustable sleeve Y, which sleeve Y allows the foot-treadle, or other tripping device to be adjusted for connection with the machinery above the table in case tables are of different heights. The draw rod X which is made in two parts to permit this adjustment is connected to the intermediate lever Z by a suitable pivot or other attachment. The intermediate lever Z is pivoted to the frame, as shown in Fig. 1 and is provided with a suitably constructed free end 5 which engages with the swinging catch 2, which swinging catch 2 is pivoted at 3 to the foot lever 1 and is provided with a notch which automatically engages with the free end 5 of the intermediate lever Z and is provided with an elbow 6, which, when the foot treadle is lowered comes in contact with the base 7 and releases the swinging catch on the intermediate lever Z. A spring 4 is adapted to hold the intermediate lever in engagement with the swinging catch and to raise the intermediate lever and its attached parts when released from engagement with the swinging catch at the end of the downward stroke of the foot treadle.

The operation of my invention is as follows: When the foot treadle is in the position shown in Fig. 1, other parts are also in the position shown in Figs. 1 and 4, and the pin N is, through the operation of the spring 4, held in connection with the sleeve H, and the power pulley D is running idly upon the shaft E. Placing the foot upon the treadle carries the same down and with it the connecting rod X is carried down, turning the bell crank W and withdrawing the pin N from engagement with the cam J of the sleeve H. The spring O thereupon causes the sleeve H to move longitudinally upon the shaft until the clutch pin I engages with one of the holes G in the revolving hub F, thus completing the connection between the power pulley D and the ultimately actuated reciprocating mechanism. This reciprocating motion thus produced will continue while the pin N remains withdrawn; but as the treadle is still further depressed by the continued action of the foot of the operator, the elbow 6 of the swinging catch 2 comes in contact with the base 7, oscillating or turning the swinging catch 2 on its pivot or fulcrum, disconnecting said catch from the intermediate lever Z. Thereupon the action of the spring 4 immediately returns the pin N to its position of engagement and the sleeve H in its revolution brings the cam J into engagement with the pin N, thereby withdrawing the clutch pin I and disconnecting the sleeve H from the hub F. The brake pin L thereupon engages with the friction depression K of the sleeve H and the movement of this sleeve and consequently of the other operative parts of the mechanism is arrested.

It is evident that the parts described can be so adjusted that the catch 2 will be tripped out of engagement with the intermediate lever Z by a downward motion of the treadle continued only very slightly beyond the point when the pin N is withdrawn so that it will be impossible, or practically impossible, for the sleeve to make more than one revolution, and the ordinary downward stroke of the foot treadle would therefore trip the clutch into engagement so as to cause one revolution and adjust the mechanism for automatically tripping it out of engagement before another revolution would be possible. On the other hand, the parts could be so adjusted that a downward motion of the treadle would cause engagement, which engagement would continue while the foot of the operator was held in such position, and then at any desired time a further continued downward motion would cause a disconnection; or the adjustment and distances could be such that the ordinary time occupied by one complete downward stroke of the operator's foot would permit two revolutions, and, therefore, two reciprocating strokes, and then would automatically cause disconnection and cessation of the produced reciprocation. It is evident, also, that the tripping means to be actuated by the operator and the means of connecting the same to the clutch could be varied in any common manner without departing from the substance of my invention. It is also evident that the ultimately actuated mechanism, instead of having the reciprocating longitudinal motion especially contemplated by this specification, might have any other form of motion appropriate for intermittent operation.

I have shown a sliding sleeve splined to the driven shaft as the preferred means of effectuating detachable engagement between the driving pulley and the driven shaft; but other methods for accomplishing such detachable engagement might be employed, the essential thing being that the parts should be united in such detachable engagement by the action of the operator through tripping means, and then that they should be automatically withdrawn from such detaching engagement as a result of a further revolution of the parts and at a point and time which have been previously determined by the selected adjustment and relation of the parts.

Having thus described my invention, what I claim to have invented, and desire to secure by Letters Patent, is—

1. The combination of a shaft, a pulley loose on said shaft, a sleeve splined to the said shaft for sliding movement, the sleeve and pulley having means to coöperate to clutch the pulley to the shaft, means for positively moving the sleeve toward the pulley, a pin for normally holding the sleeve out of engagement with the pulley, the sleeve having a cam device engageable by the pin to move the sleeve out of engagement with the pulley during the rotary movement of the shaft, a yieldably operated checking device to act against the sleeve, a lever, and connections between the lever and the pin for drawing the pin back when the lever has moved a certain distance and for releasing said pin on the continued movement of the lever.

2. The combination of a shaft, a pulley loosely carried by the shaft, a sleeve splined to the shaft for sliding movement, the sleeve and pulley having coöperative means to clutch the pulley to the shaft when the two are in engagement, a spring to normally move the sleeve into engagement with the pulley, said sleeve having a depression and a cam, a pin acting against the cam to normally hold the sleeve out of engagement with the pulley, the pin when retracted serving to release the sleeve and the sleeve being returned to its initial position out of engagement with the pulley by the pin when said pin is in its normal position, a spring controlled checking device to enter said depression, and means for drawing the said pin back to release the sleeve and for then returning the pin positively to its normal position.

3. The combination of a shaft, a pulley loosely carried by the shaft, a sleeve splined to the shaft for sliding movement, the sleeve and pulley having coöperative means to clutch the pulley to the shaft when the two are in engagement, a spring to normally move the sleeve into engagement with the pulley, said sleeve having a depression and a cam, a pin acting against the cam to normally hold the sleeve out of engagement with the pulley, the pin when retracted serving to release the sleeve and the sleeve being returned to its initial position out of engagement with the pulley by the pin when said pin is in its normal position, a spring controlled checking device to enter said depression, a lever operatively connected with said pin, a second lever for operating the first lever, a detent on the second lever for engaging the first lever to cause the two to move a certain distance together, and means for tripping the detent when the levers have moved said certain distance to release the first lever.

In testimony whereof I have hereunto set my hand in presence of two subscribing witnesses.

WILLIAM E. ELLIOTT.

Witnesses:
A. C. DENISON,
MARY S. TOOKER.